United States Patent [19]

Fink et al.

[11] Patent Number: 4,948,998
[45] Date of Patent: Aug. 14, 1990

[54] ELECTRIC MOTOR

[75] Inventors: Richard A. Fink, Rougemont; Robert C. Ellis, Jr., Durham, both of N.C.

[73] Assignee: Honeywell Incorporated, Minneapolis, Minn.

[21] Appl. No.: 295,723

[22] Filed: Jan. 10, 1989

[51] Int. Cl.[5] ..................... H02K 23/36; H02K 13/00
[52] U.S. Cl. ................................. 310/127; 310/136; 310/148
[58] Field of Search ............... 310/127, 133, 136, 148, 310/134, 140, 128

[56] References Cited

U.S. PATENT DOCUMENTS

| | | | |
|---|---|---|---|
| 517,105 | 3/1894 | Henderson | 310/140 |
| 541,854 | 7/1895 | Hicks | 310/136 |
| 823,568 | 6/1906 | Waters | 310/136 |
| 2,190,887 | 2/1940 | Schaeren | 310/127 |
| 3,184,627 | 10/1960 | Sears | 310/127 |
| 3,892,987 | 7/1975 | Noodleman | 310/219 |
| 4,283,651 | 8/1981 | Hummert | 310/148 |

Primary Examiner—Patrick R. Salce
Assistant Examiner—C. LaBalle
Attorney, Agent, or Firm—William W. Holloway; Roger W. Jensen; Dale E. Jepsen

[57] ABSTRACT

The electric motor contemplated by this invention includes an armature having two opposed faces mounted on a shaft. The armature is mounted on the shaft intermediate of the ends of the shaft. A pair of commutators are mounted on the shaft adjacent to each of the opposed armature faces. Each of the commutators includes a plurality of commutator bars, each of which has its circumferential width offset relative to the circumferential width of the commutator bars on the other commutator. Alternately or in combinatrion, with the commutator bar offset the brushes in operative engagement with each of the commutators are arranged with their circumferential width offset, relative to the circumferential width of the brushes in operative engagement with the opposite commutator. The electric motor can also be provided with a redundancy capability by a circuit arrangement in which one of the commutators is held as a backup in the event of a failure of the windings of the other commutator.

11 Claims, 4 Drawing Sheets

ELECTRIC MOTOR

BACKGROUND AND SUMMARY

This invention relates to electric motors and more particularly to direct current (DC) drive motors.

Many spacecraft applications rely on DC motors because of the relatively high output power available for a given motor size. Typically, these DC motors are used with a 28 volt DC power supply. The use of such low voltage power supplies requires that relatively high input currents be delivered to the motor through the motor brushes in order to obtain the desired output power.

However, such high input currents increase the current density in the motor bushes. This increase in current density can be detrimental to the useful life of the motor brushes. Since brush wear is also accelerated due to the near vacuum of the space environment, the need for reducing the current density of the brushes becomes more important.

Faced with the requirement for reducing current density in order to increase brush life, conventional DC motor design calls for increasing the cross sectional contact area of the brush either by increasing the brush size or by providing multiple brushes. Some attempts to reduce current density and increase reliability of conventional DC motors have led to compromises involving very large brushes of unusual and sometimes fragile proportions. Such compromises have sometimes succeeded in reducing high current densities only to result in high brush wear rates due to increased frictional resistance at the brush and commutator interface.

Another problem encountered in the near vacuum environment is the generation of electromagnetic interference that results from the electrical arcing that occurs when the brush breaks contact with each commutator bar during normal operation of the motor. This arcing also contributes to brush wear.

Still another problem encountered with conventional DC motor design is an undesirable torque ripple induced in the motor as the brush breaks contact with one commutator bar and makes contact with the next bar.

Another approach to reduce the foregoing problems for conventionally designed motors calls for increasing the number of coils in the armature windings with a corresponding increase in the number of commutator bars. Unfortunately, the increase in the number of bars requires a circumferentially narrower brush design to avoid shorting of too many bars. Moreover, the narrowing of the brush requires an extension of the brush dimension in the axial direction to maintain a desired current density which again can result in a fragile brush of abnormal proportions.

It is an object of this invention to provide an electric motor with longer brush life.

It is a feature of this invention to provide a smaller size electric motor.

It is still another feature of this invention to provide an electric motor with improved reliability.

It is a further feature of this invention to provide an electric motor having a reduced electromagnetic interference.

It is a still further feature of this invention is to provide an electric motor wherein the torque ripple is minimized.

In view of the foregoing discussion it would be advantageous, therefore, to remedy the above noted deficiencies. To this end the electric motor contemplated by this invention includes an armature having two opposed faces mounted on a shaft intermediate of the ends of the shaft. The electric motor further includes a pair of commutators mounted on the shaft. One each of the commutators is mounted adjacent to each of the faces of the armature. Each of the commutators includes a plurality of commutator bars, each of which has its circumferential width offset relative to the circumferential width of the commutator bars on the commutator mounted adjacent the opposite armature face.

These and other objects and features of our invention are pointed out in the following description and claims taken together with the accompanying drawing. It is to be understood, however, that the drawing is for purposes of illustration only and not a definition of the limits of the invention, the limits of the invention being determined by reference to the appended claims.

DETAILED DESCRIPTIONS

Figure 1:
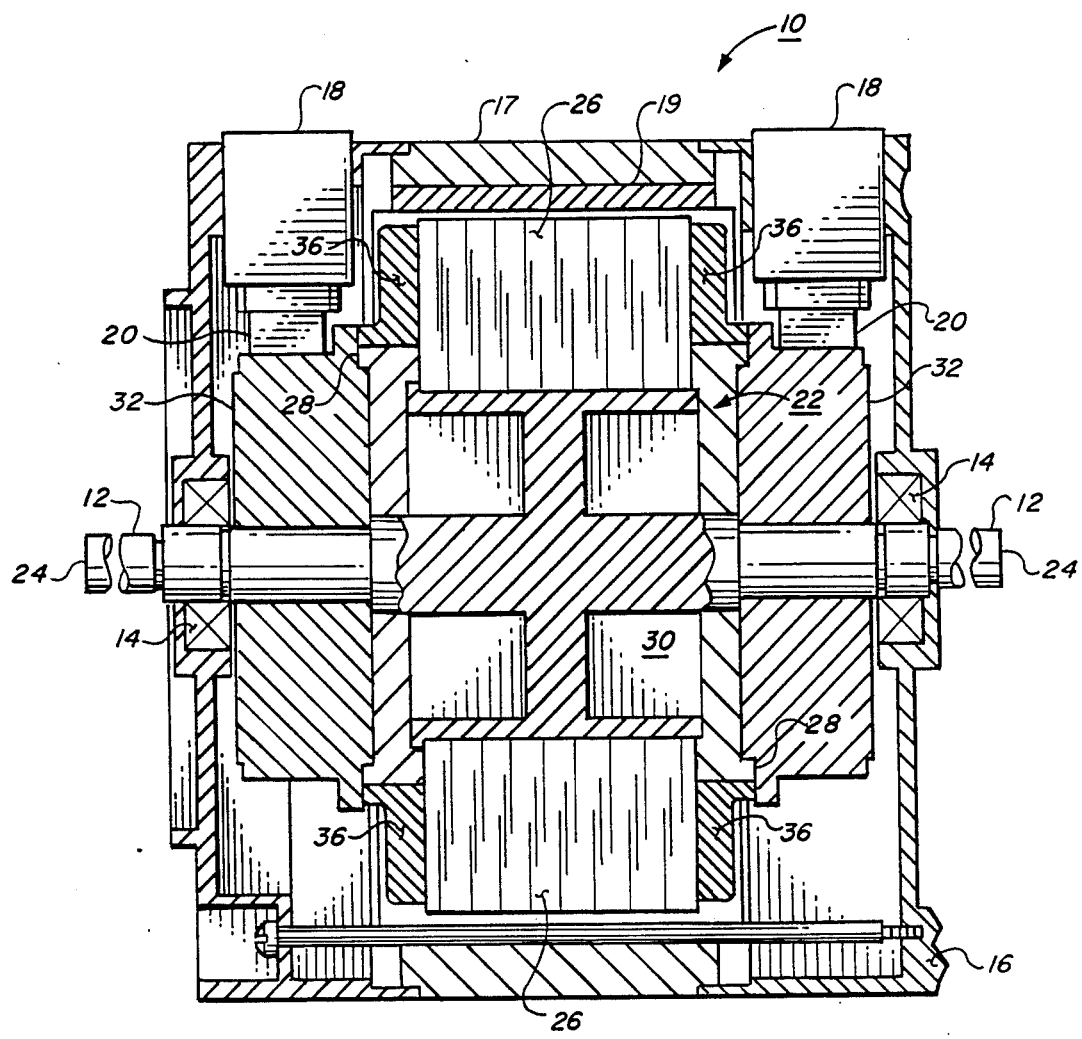
FIG. 1 is a diagrammatic sectional view illustrating an electric motor according to teachings of this invention.

Turning now to the drawings in which like reference characters indicate corresponding elements throughout the several views, attention is first directed to FIG. 1 which illustrates an electric motor 10 embodying the teachings of the instant invention.

Motor 10 includes a shaft 12 extending through the motor and supported on bearings 14 of a conventionally constructed supporting frame 16. Supporting frame 16 includes a stator portion 17 and stator winding 19 and a plurality of brush holders 18 which retain brushes 20.

An armature or rotor 22 is mounted on shaft 12 for rotation therewith intermediate ends 24 of the shaft. Armature 22 includes a plurality of laminations 26. Arranged between opposed armature faces 28 is a commutator 32. Commutator 32 includes a plurality of radially arranged segments or bars 34 best seen at FIGS. 2 and 3. Brush holders 18 include a conventional spring biasing arrangement, not shown, for holding brushes 20 in operative engagement with commutator 32 through biased contact with the surface of commutator bars 34.

Four windings 36 are arranged in a pair of parallel sets in armature slots, not shown, formed in armature 22. Windings 36 include a plurality of coils, not shown, arranged in parallel pairs. Each coil has a first end 38 and 39 a second end 40. One end 38, and 39 best seen in FIGS. 4A (39) and 4B (38), of one coil in a parallel pair and the second end 40 of the other coil of the parallel pair terminate at the same commutator bar 34. It is to be understood that conventional techniques are applied in the construction of armature 22, commutator bars 34, windings 36 and in the terminations of coil ends 38 and 40 on commutator bars 34.

In one embodiment of the invention, each commutator was constructed with forty-nine commutator bars 34 with the armature 22 wound with two parallel windings 36, each winding having forty-nine parallel sets of coils, not shown.

In this embodiment, the commutators 32 on each side of armature 22 are mounted on shaft 12 with the commutator bars 34 arranged with each bar 34 offset by one-half of the circumferential width of the bar 34 relative to bars 34 on the commutator 32 on the opposite side of armature 22.

Figure 2:
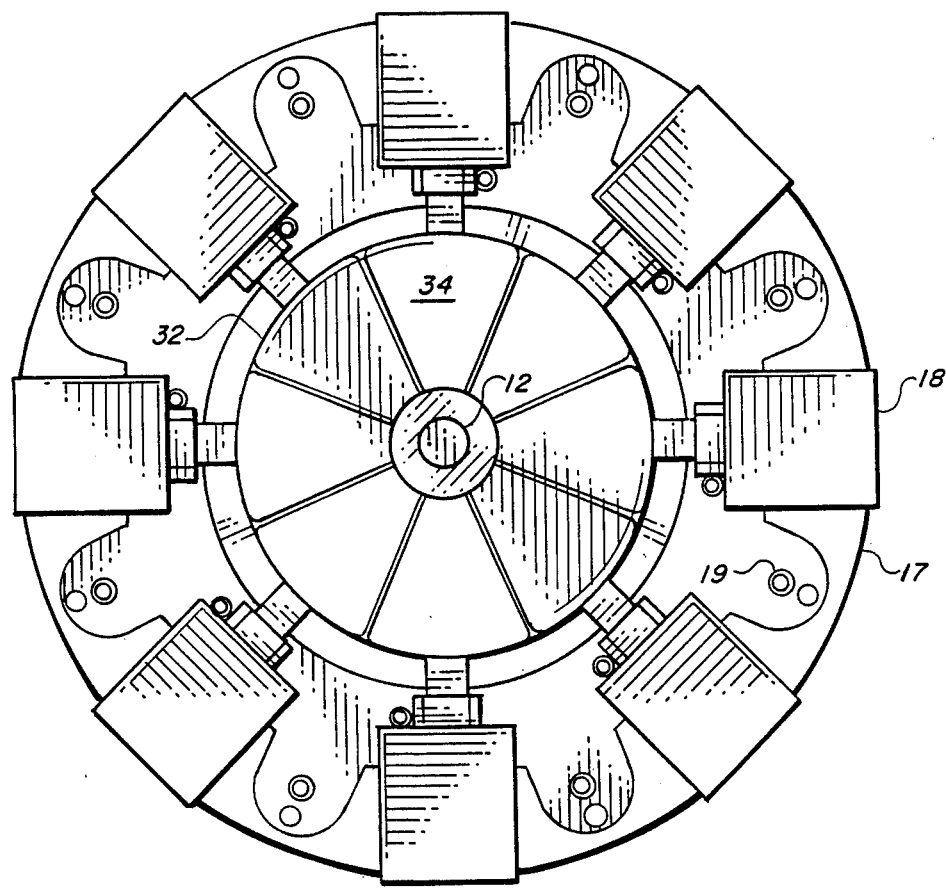
FIG. 2 is a diagrammatic and view of the motor of FIG. 1 with the motor frame bearing end removed.
Figure 3:
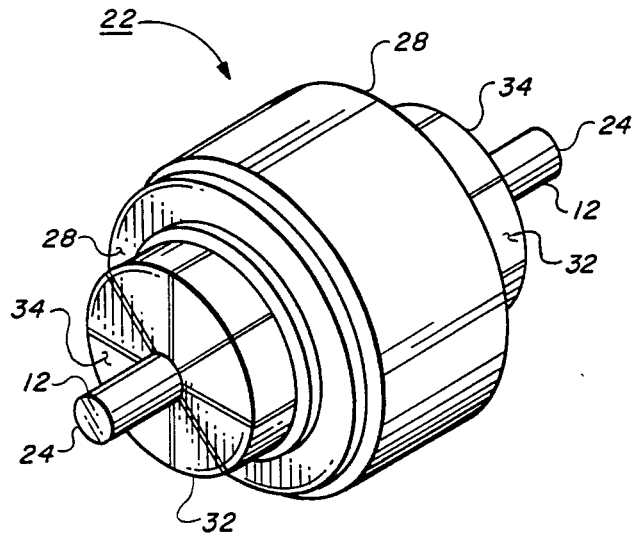
FIG. 3 is a perspective view illustrating the rotating elements of the motor of FIG. 1.

By placing a commutator 32 on each side of the armature 22, the number of brushes 20 that can be installed in the motor 10 is double the maximum brush count of a conventional motor. Normally, the maximum number of brushes which can be used is equal to the number of poles in the motor, half of the brushes being of positive polarity and half of the brushes being of negative polarity. For example, a conventional eight pole motor would have only eight brushes to carry the required current density. FIG. 2 shows an eight pole motor having eight brushes 20 on commutator 32, but, inasmuch as the illustrated motor is built according to the teachings of this invention, there are an additional eight brushes 20 on the commutator 32 adjacent the opposite face 28 of armature 20, hidden from view in FIG. 2. This arrangement provides a total of sixteen brushes, thereby halving the current density in each of the brushes 20 when compared to a conventional single commutator eight pole motor.

In the eight pole embodiment of the motor mentioned above, there are sixteen brushes available in which to distribute the required current density.

Figure 4A:
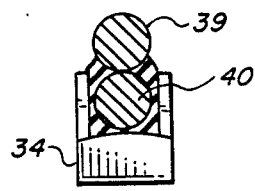
FIG. 4A is an illustration of a portion of a prior art commutator bar showing a relatively large diameter coil wire termination.
Figure 4B:
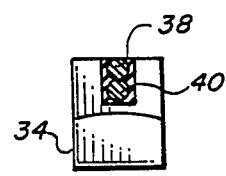
FIG. 4B is an illustration of a portion of a commutator bar according to this invention showing a relatively small diameter coil wire termination.

In the electric motor 10 of this invention, each commutator 32 is connected to a separate set of windings 36. Since each of these set of windings 36 operate in parallel, each coil, not shown, of the winding 36 can be formed of a smaller wire size when compared to a motor with a single commutator. This is especially important when very large wire sizes would normally be used in the conventional single commutator motor. FIG. 4A, illustrates an unacceptable commutator termination design since top wire 39 is not properly embedded on commutator 34. The same size commutator bar can, however, accommodate a smaller wire size. For example, see FIG. 4B. If a particular conventional motor application requires a motor having coil wires formed of a number 14 American Wire Gauge (AWG), not shown, the coil wires of the motor 10 of this invention can be constructed using number 17 AWG as shown in FIG. 4B. Using a number 17 AWG results in a wire size that is easier to form in the armature slots, not shown, of armature 22. Because the width of commutator bar 34 must be made wider than the diameter of the wire size used in the winding, a reduction in wire size means that each commutator bar can be smaller, which may result in a larger number of commutator bars for a given size motor, or alternately, a smaller size motor.

Figure 5A:
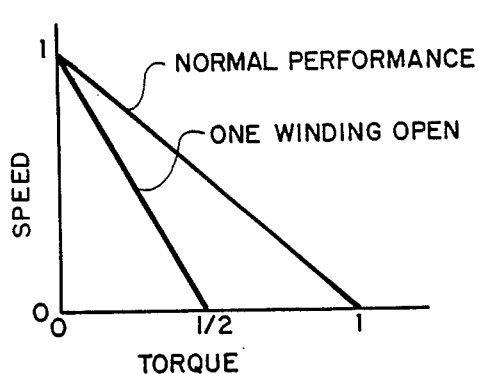
FIG. 5A is an illustration of a Speed v. Torque graph for a prior art motor.
Figure 5B:
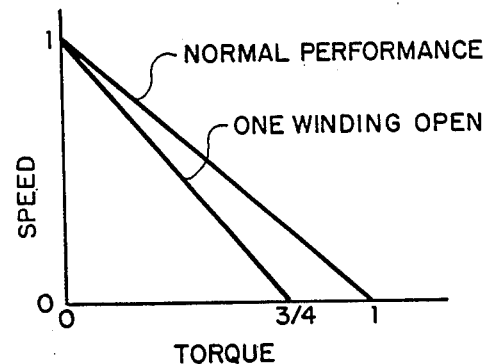
FIG. 5B is an illustration of a Speed v. Torque graph for a motor according to this invention.

As illustrated in FIG. 5A and 5B, the reliability of the motor contemplated by this invention is enhanced because an open winding is the most common failure mode of conventional wound motors. In FIG. 5A, it is shown that in motors provided with two parallel windings, if one of the windings opens, the motor will lose one-half of its stall torque. However, in FIG. 5B, it is shown that in the two commutator motor of this invention, which is provided with four parallel windings, if one of the windings opens, the motor will lose only one-quarter of its stall torque and, in all likelihood, the motor will continue to perform its intended function.

Figure 6:
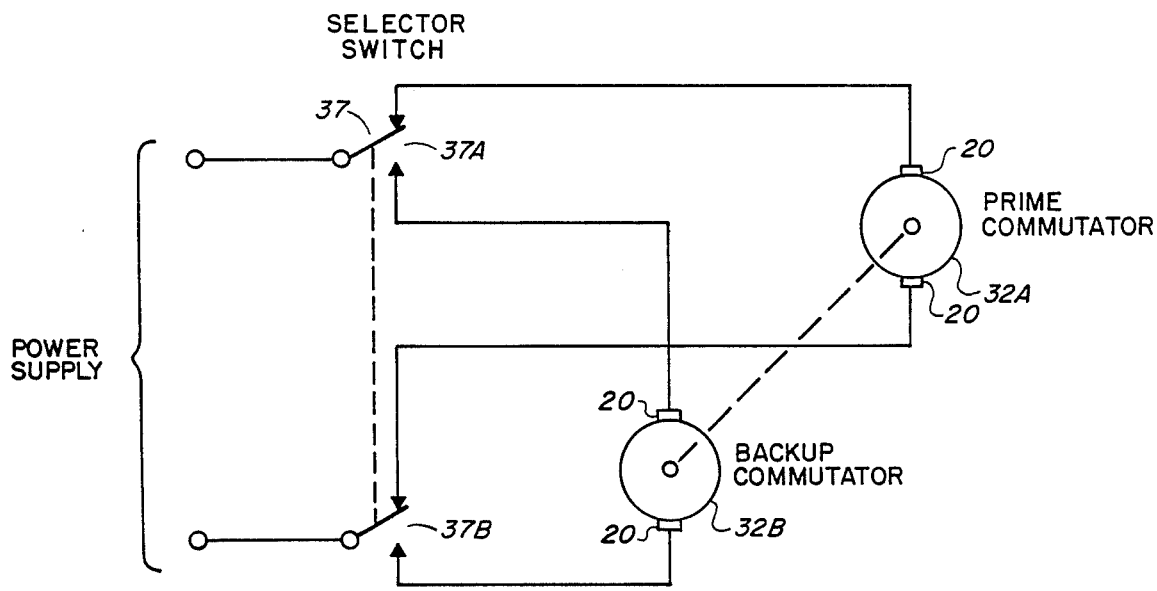
FIG. 6 is an illustration of a circuit to implement redundant motor operation.

Referring now to FIG. 6, the motor 10 contemplated by this invention can be configured to provide a redundancy capability by arranging, for example, a control circuit for the motor 10 so as to apply power to one of the commutators 32A through one set of windings while the other commutator 32B is held as a backup for the powered commutator 32A. Upon detection of a motor failure due to a failure in the powered commutator 32A winding set, the backup commutator 32B can be activated to continue the functioning of the motor by transferring selector switch 37 from switch contacts 37A to switch contacts 37B.

Electromagnetic interference (EMI) radiation is produced by electric motors as the result of electrical arcing caused by loss of contact between the motor brushes and each commutator bar as the armature rotates. In addition to producing EMI, contact arcing also effects, negatively, the useful life of the motor brushes.

Figures 7A, 7B:
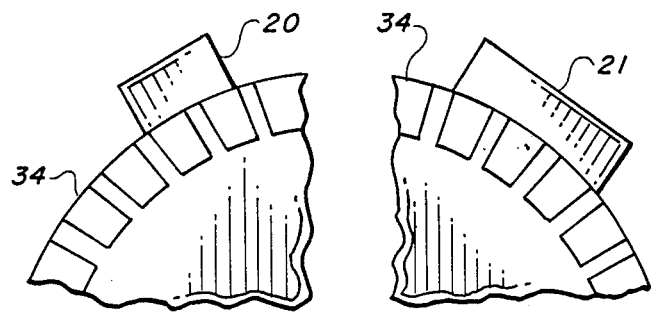
FIG. 7A is an illustration of a section of a commutator showing a desirable brush proportion according to the present invention.
FIG. 7B is an illustration of a section of a commutator showing a prior art undesirable brush proportion.

To reduce both EMI and brush wear in conventional motors, it is desirable to use a relatively large number of coils and a correspondingly large number of commutator bars. Unfortunately the number of bars for a given size motor is limited to brush current density considerations, by wire size, and by limits on the brush configuration. This effect can be seen be reference to FIG. 7A. A large number of bars requires a narrow brush in a circumferential sense to avoid shorting out too many commutator bars. Brush current density considerations would dictate a wider brush 21 in the circumferential direction as shown in FIG. 7B. This would, however, short out an excessive number of bars 34, adversely affecting many performance parameters. To satisfy the current density requirements and avoid shorting too many bars, an increase in the size of the brush 21 in an axial direction is required. A fragile brush of abnormal proportions can result. However, the foregoing problem is alleviated by the electric motor 10 contemplated by this invention wherein the brush 20 length in the axial direction can be halved by the two commutator motor.

In conventional motors, an undesirable torque ripple is induced as the brush moves across the gap between commutator bars. To reduce the effect of the torque ripple, it is also desirable to provide a large number of commutator bars resulting again in a fragile and abnormal brush design for the same reasons as discussed above. In addition to the solution of the abnormal brush design problem mentioned above, the electric motor contemplated by this invention provides a means for reducing undesirable torque ripple by offsetting the commutator bars in each commutator relative to each other by one-half the circumferential width of each bar. This can be done by offsetting the commutators relative to each other by one-half the circumferential width of the bar. In this arrangement, only half of the motor current is commutated at any instant, reducing the torque ripple as well as total conducted current ripple. A similar effect can be produced by offsetting the brushes of one commutator relative to the circumferential width of the brushes of the opposed commutator.

It will now be apparent to those skilled in the art that many changes may be made to the above described invention without departing from the spirit of the invention and the scope of the appended claims.

What is claimed is:

1. An electric motor comprising:
    (a) a motor shaft having opposed ends;
    (b) an armature having opposed faces mounted on said shaft intermediate said ends, wherein said armature includes four windings arranged in two sets of parallel pairs, said windings including a plurality of coils arranged in parallel pairs and each of said coils including a first end and a second end; and
    (c) a commutator mounted on said shaft adjacent each of said faces, each of said pair of windings being connected to one of said commutators, each of said commutators including a plurality of commutator bars, a first end of one coil in a parallel pair and a second end of the other coil in said parallel pair terminating at the same commutator bar, wherein each of said commutators are arranged on said shaft with a circumferential width of each commutator bar on one of said commutators offset relative to a circumferential width of each commutator bar on the other of said commutator bars.

2. The electric motor of claim 1 wherein said relative offset is one-half said circumferential width of each of said commutator bars.

3. The electric motor of claim 1 further comprising: brush means held in operative engagement with each of said commutators.

4. The electric motor of claim 3 wherein said brush means include brushes held in biased contact with said commutator bars.

5. The electric motor of claim 4 wherein said brushes are arranged around a circumferential periphery of said commutator.

6. The electric motor of claim 5 wherein said brushes include a circumferential width and said circumferential width of the brushes on one of said commutators is offset relative to the circumferential width of said brushes on an opposed commutator.

7. The electric motor of claim 6 wherein said relative offset is one-half the circumferential width of each of said brushes.

8. The electric motor of claim 1 wherein said brush means are held in operative engagement with said commutator bars.

9. The electric motor of claim 8 wherein said brush means include brushes held in biased contact with said commutator bars.

10. The electric motor of claim 9 wherein said brushes are arranged around said circumferential periphery of said commutators.

11. The electric motor of claim 10 wherein said brushes include a circumferential width and said width of said brushes on one of said commutators is offset relative to said width of said brushes on an opposed commutator.

* * * * *